March 26, 1935.　　W. E. URSCHEL　　1,995,693
VEGETABLE PEELER
Filed July 29, 1932　　3 Sheets-Sheet 1

INVENTOR
William E. Urschel
BY Henry B. Floyd
ATTORNEY

March 26, 1935. W. E. URSCHEL 1,995,693
VEGETABLE PEELER
Filed July 29, 1932 3 Sheets-Sheet 3

INVENTOR
William E. Urschel
BY Henry B. Floyd
ATTORNEY

Patented Mar. 26, 1935

1,995,693

UNITED STATES PATENT OFFICE 1,995,693

VEGETABLE PEELER

William E. Urschel, Valparaiso, Ind.

Application July 29, 1932, Serial No. 626,148

10 Claims. (Cl. 146—49)

The present invention relates to a machine for removing the peeling from fruits or vegetables, and has to do particularly with such a machine adapted to remove the peeling with a minimum of waste.

Such object of the invention is attained by means of an agitated bed of interchangeable, rotating peeling members, made up of various contours and of materials best suited for the fruit or vegetable whose peeling is to be removed. The agitation of the rotating peeling members tends to tumble the fruits or vegetables about, causing all surface portions to come into contact with the peeling members, but not allowing such contact to be long enough or to be with enough pressure to cause a removal of any of the fruit or vegetable body beneath the peeling.

Another object of the present invention is to provide a means for peeling the low spots or depressions on the surface of irregularly shaped fruits or vegetables and without removing any of the material other than the peeling from the high spots or elevated surface portions.

The invention will be more fully understood by reference to the following detailed description when considered in connection with the accompanying drawings hereby made a part of this specification, and wherein.

Like reference characters are used in the drawings and throughout the following description for designating similar parts.

Figure 1:
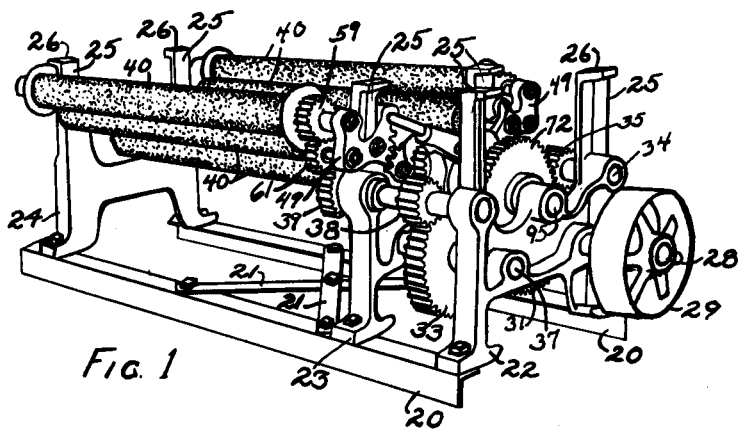
Figure 1 is a perspective view of an entire machine embodying the invention with the feed hopper removed.

A frame for the device is illustrated in Figure 1. Such frame may comprise longitudinal angle members 20 to be held in place by diagonally arranged brace members 21 and transversely arranged bearing hangers 22, 23 and 24. Extending upwardly from the bearing hangers 22, 23 and 24 are legs 25 presenting at their upper extremities flat faces 26 upon which a hopper 27 may be placed. The hopper 27 is illustrated in Figures 2 and 3.

Commonly journaled in the bearing hangers 22 and 23 is a shaft 28 upon which there is a drive pulley 29 and spur gears 30 and 31. In parallelism to the shaft 28 and extending between the bearing hangers 22 and 23 is a shaft 32 which has a gear 33 keyed thereto for meshing with the gear 31.

Figure 2:
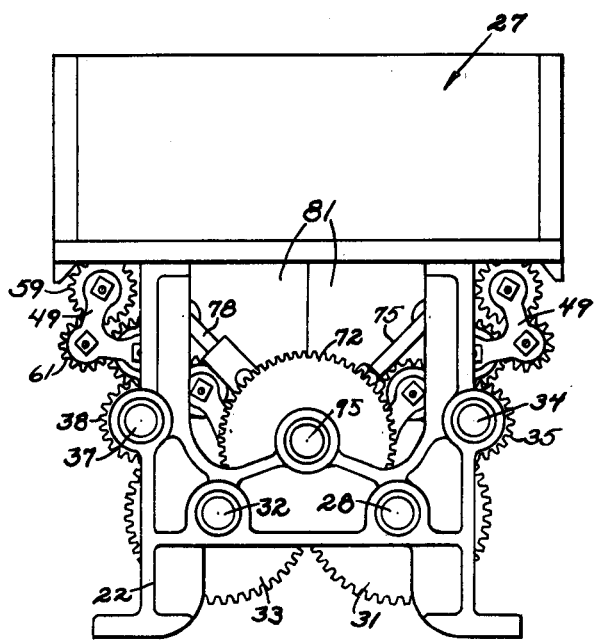
Figure 2 is an elevation of the drive end of the machine shown in Figure 1 with the drive pulley removed.
Figure 4:
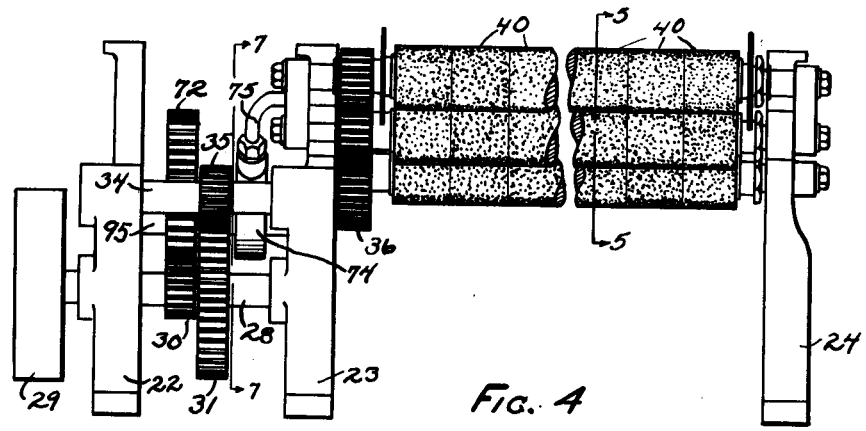
Figure 4 is a side elevation of the machine with the feed hopper removed.
Figure 3:
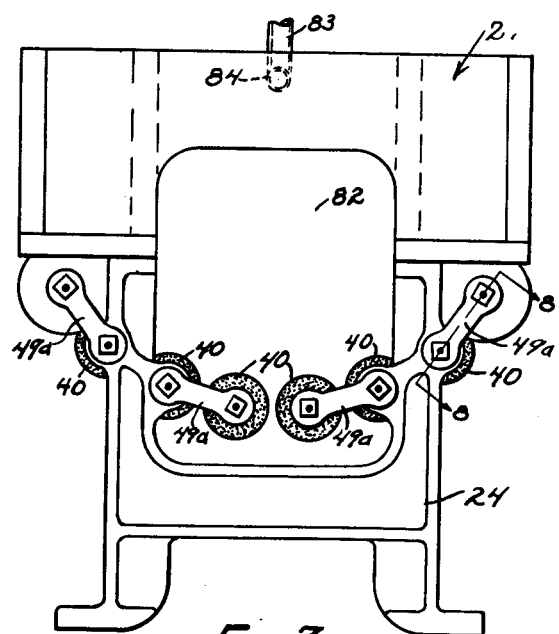
Figure 3 is an elevation of the discharge end of the machine.

Above the shaft 28 and offset outwardly therefrom is a shaft 34, Figures 1, 2 and 4. The shaft 34 carries between the standards 22 and 23 a gear 35 to be driven by the gear 31 and a gear 36 for driving other gears and mechanism to be described later. Opposite to the shaft 34 is a shaft 37 similarly disposed between the bearing hangers 22 and 23 and which has keyed thereto a gear 38 for meshing with the gear 33. Keyed to the innermost end of the shaft 37 which projects beyond the standard 23 is a gear 39. The gear 39 is for driving the gears of other mechanism of the device presently to be described.

Figures 5, 6:
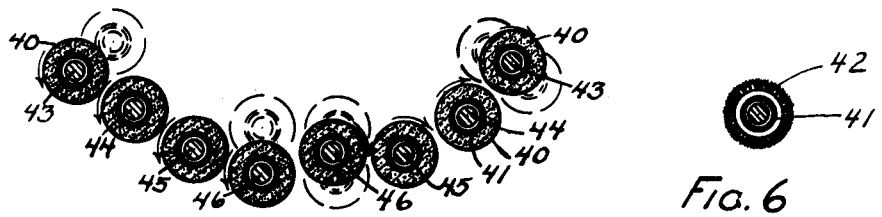
Figure 5 is a view of the device in section taken at the line 5—5 of Figure 4.
Figure 6 illustrates in section a peeling member incorporating bristles in its structure.

In Figure 5 is shown a group of cylindrical rollers 40 which are mounted upon sleeves 41 for rotation therewith. Rollers 40 are the members which remove the peeling from the vegetables or fruits to be treated by the device and are arranged at the bottom of the hopper 27 to form its bottom. Usually the cylindrical members 41 if constructed of a solid substance will have a roughened surface, however, instead of a roughened solid substance the members 40 may be formed of bristles 42 as illustrated in Figure 6.

Figure 7:
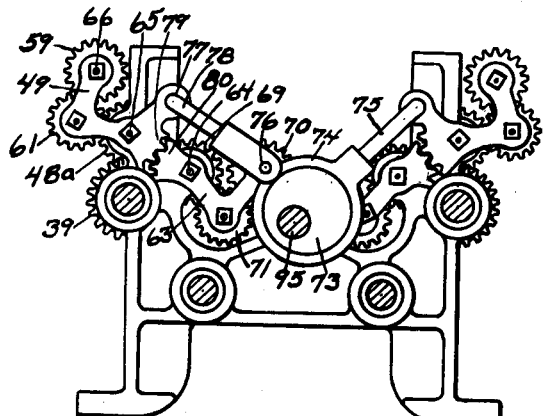
Figure 7 is a view of the device in section taken on line 7—7 of Figure 4.

There are an even number of the peeling members 40 and the members are operated in pairs. In Figure 5 will be observed rods 43, 44, 45 and 46. Rods 44 and 45 are journaled within the standards 23 and 24 while the rods 43 and 46 are connected respectively to the rods 44 and 45 in a manner to pivot thereabout. Since the two sides of the machine on either side of a central vertical plane positioned axially thereof are of identical construction the description will be directed particularly to the left side of the machine as seen in Figure 7.

Figure 8:
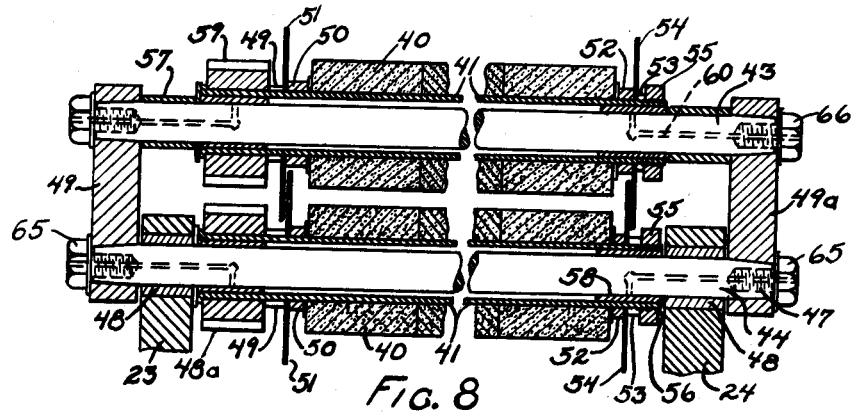
Figure 8 is a sectional view of the peeling mechanism taken at the line 8—8 of Figure 3.

In Figure 8 is illustrated the manner in which the two rods 43 and 44 are connected to one another and the manner in which the assembly is journaled within the standards 23 and 24. It will be noted that the two rods 43 and 44 in themselves are identical, as are all of the rods 43, 44, 45 and 46. Each rod is tapered at either end where it is tapped and threaded at 47. The rod 44 is rotatively contained within the bearing hangers 23 and 24 in bushings 48.

Inwardly of the bearing standard 23 is a gear 48a which is keyed or otherwise secured to the sleeve 41. Adjacent to the gear 48a are collars 49 and 50 and a disk 51 which measurably space the peeling member 40 from the gear 48a. At the opposite end of the sleeve 41 which is threaded at 56, are collars 52 and 53, a disk 54 and a nut 55 which engages the threads 56 for advancing the peeling member against the collar 50.

A rigid frame is formed by the two rods 43 and 44, the lever 49 and the arm 49a. When the rod 44 is rotated within the bushings 48 the rod 43 is carried about the axis within the first named rod. Upon the rod 43 is carried a flanged collar 57 to space the sleeve 41 from the lever 49. Within either end of the sleeves 41 are bushings 58 which serve as bearing members between the rods and the sleeves to facilitate the latter being rotated about the rods. The collars 49 and 50 and the disk 51 upon the sleeve 41 carried by the rod 43 selectively space the peeling member 40 from the gear 59 as do the said collars and disk about the rod 44 position the peeling member upon that rod from the gear 48a. The disks 51 on the adjacent sleeves are arranged so that they will not coincide but rather will be placed so as to project alongside one another. The opposite end of the peeling member 40 upon the upper sleeve 41, Figure 8, is held in position by means of collars 52 and 53 and a disk 54 in the same manner as is the peeling member therebelow about the rod 44.

Lubrication of the bushings 58 is had by means of ducts 60 which lead from beneath the bushings 58 inwardly of the rods 43 or 44, or the other rods upon which the sleeves 41 are mounted, and outwardly to the end of those rods so that lubricant may be forced to the bearing surface between the bushings and the rods.

Figure 7 shows a gear 61 which commonly meshes with the gears 48a and 59 so that the gear 59 may be driven to rotate in the same direction as does the gear 48a. Motive power is received by the gear 48a from the gear 39.

The two rods 45 and 46 are connected together in much the same manner as are the rods 43 and 44. Of the two rods 45 and 46 the rod 45 is the stationary one and is journaled within the bearing standards 23 and 24, the forward end of the rod 45 projecting forwardly of the bearing standard 23 and through the lever arm 63, Figure 7, to be engaged thereto in a non-rotative manner by bolt 64. At this time it will be noted that bolts 65 hold the lever 49 and the arm 49a tightly against the coniform ends of the rod 44 in a non-rotative manner. Also there are bolts 66 to engage the lever 49 and the arm 49a to the rod 43 so that the rod will not turn in its setting. The ends of the rod 45 may present coniform ends as do the rods 43 and 44 so that the lever 63 and the arm 49a may be pressed thereon in a non-rotative manner.

Within an end of the lever 63 is anchored one end of the rod 46, the opposite end of the rod being anchored within the extended end of the arm 49a at the opposite end of the machine. The sleeves 41 upon the two rods 45 and 46 carry gears 69 and 70 which are commonly engaged by an idler gear 71 suitably mounted upon the lever 63. Gear 39 engages the gear 69 for rotating that gear and the peeling member in connection therewith through the sleeve 41, and the gear 69 in turn rotates gear 70 by means of the gear 71 for rotating the peeling cylinder about the rod 46. Because of the indirect driving of the gear 70 by the gear 69 through the gear 71 the peeling elements carried upon the shafts 45 and 46 are caused to rotate in the same direction in the manner indicated by the arrows in Figure 5.

Centrally disposed within the two bearing hangers 22 and 23 are suitable bearings for carrying a shaft 95. Keyed to the shaft 95 is a gear 72 to provide for the driving of that shaft by the coaction therewith of the gear 30. Also secured to the shaft 95 is an eccentric 73, and about the eccentric is an eccentric follower 74 which is connected to the lever 49 on the right side of the device, Figure 7, by means of a rod 75. Pivotally connecting the eccentric follower 74 at 76 and the lever 49 at the left side of the device, Figure 7, and at the point 77, is a rod 78. Arcuate toothed sections 79 and 80 respectively upon the two levers 49 and 63 operatively connect the two lever members.

In Figure 2 will be noted plates 81 which form the side of the hopper at the front end of the device and which fit closely alongside of the disks 51 which are upon the sleeves 41 at a short distance from the peeling members 40. In the opposite end of the hopper 27, and shown in Figure 3, is an opening 82 which may be closed by a sliding door (not shown). The door for closing the opening 82 when in the closed position will fit closely alongside of the disks 54 near the ends of the sleeves 41. In the upper part of the hopper there may be disposed a sprinkling pipe 83 having apertures within a horizontal section 84 thereof which extends longitudinally of the hopper.

When the machine is to be placed in operation, the hopper 27 is filled, or partially filled, with the items which are to be peeled. Thereafter the device is set in motion by applying power to the pulley 29 and the water is turned into the sprinkling pipe 83 so that a constant stream of water will be played over the items as they are being peeled. Power is transmitted from the gear 31 to the gear 33, thence to the shaft 37 and the gear 39 by means of the gear 38.

At the opposite side of the machine from the shaft 37 the shaft 34 is turned by means of the gear 35 which engages the gear 31 and to rotate the gear 36. As viewed from the front of the machine, gears 39 and 36 will be rotated in a clockwise direction and in an anticlockwise direction, respectively.

By such rotation of the gears 39 and 36, the gears 48a and 69 at the left side of the machine will be rotated in a counterclockwise direction while the same gears at the right side of the machine will be rotated in a clockwise direction. Since the idler gears 61 and 71 connect the gears 48a and 69 to the gears 59 and 70 the latter named gears are caused to rotate in the same direction as either of the gears 48a or 69 on their respective sides of the machine. It is deduced from the above that the peeling members 40 on one side of the machine will be caused to rotate in one direction, and the peeling members on the other side of the machine will be caused to rotate in the opposite direction as indicated in Figure 5.

The bottom-most members to be peeled and which are at the left side of the machine with reference from the front will be tumbled about by the peeling members 40 and will be gradually progressed further to the left. Concurrently the fruit or vegetable items at the bottom and right side of the hopper will be similarly tumbled but progressed to the right. As the items are thus carried from the bottom center of the hopper and outwardly and upwardly by the irregularly curved bottom of the hopper formed by the bed of rollers, other items will pass downwardly through the central body of the group to replace those which are displaced and to be moved along the surface of the rollers to be tumbled and to have the peel removed therefrom.

To further turbulate the articles being peeled, the levers 49 are rocked by the action of the eccentric 73, the eccentric follower 74 and the connecting links 75 and 78. Rocking of the levers 49 causes a rocking of the levers 63 which are engaged thereto by the gear teeth 79 and 80, to cause an oscillating movement of the rods 43 and 46 to and from the positions shown in full and dotted outline in Figure 5. In this manner the topography of the bed of rollers is changed.

When the cover is removed from the opening 82 after the articles are peeled, those articles may be removed by way of the opening. If the machine be tilted to place the end having the opening 82 lower than the other end and the opening 82 be left open, or partially open at the bottom, the articles may be fed into the higher end of the hopper and be progressed toward the opening to drop therefrom at the time they are peeled.

The peeling as it is removed from the articles being peeled is loosened both from the items and from the roughened surface of the peeling members by the water as it trickles downwardly through the group of articles. In this way the peeling members are scavenged and kept free of peeling particles and the articles are cleaned.

Figure 9:
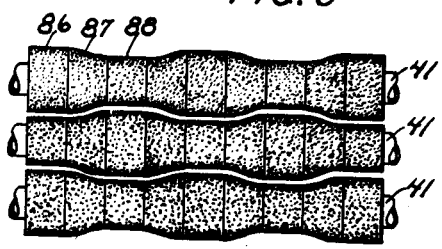
Figure 9 is an orthographic projection of peeling members of a selected contour.

In Figure 9 is illustrated a form which may be taken by the peeling members. In the members illustrated in Figure 9 are a plurality of sections 86, 87, and 88 which are of different diameters. Sections 86 and 88 are the extremes of the two diameters while a section 87 increases from a small diameter at one end which is the same as the diameter of the sections 88 and to a greater diameter at the opposite end corresponding to the diameter of the larger of the peeling member sections. The sections of greater and lesser diameter on adjacent sleeves 41 are arranged alternately so that the sections of greater diameter will be opposite to the sections of a lesser diameter and so that the space between the two peeling members will be uniform throughout their length.

Figure 10:
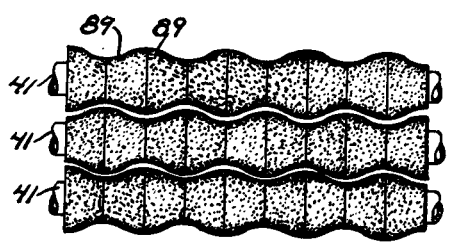
Figure 10 is a view similar to Figure 9 illustrating peeling members of a different contour.

A modification of the peeling members having a surface of a multiple of diameters is shown in Figure 10. In Figure 10 instead of there being three different forms of peeling member sections there is but a single form of section 89. The sections 89 are of a greater diameter at one end than the other end and any contour may be taken by the sections within the surface between the two extremities. Sections 89 are arranged upon the sleeves 41 with alternate sections turned in opposite directions. The contour of the sections 89 is arranged so that the sections of greater diameter will coincide with the sections of lesser diameter upon the adjacent sleeve.

By constructing the peeling members in the manner illustrated in Figures 9 and 10, or in variations of those forms which are readily conceivable, surfaces angular to one another are obtained whereby the fruit or other items being peeled are tumbled in every direction so that whatever may be the shape of the items, they will at some time be turned so that every part of the surface will be presented to the peeling members.

What is claimed as new and is desired to be secured by Letters Patent of the United States is:

1. A peeling device comprising a bed of roughened rollers having sections of varying diameter and providing a support for a group of articles to be peeled, said rollers being rotatable within the plane of said bed relative to one another for peeling such articles and being displaceable to one another normally to the plane of said bed to shift the position of articles relatively to said bed, means for rotating said rollers, and means for effecting the displacement of said rollers during the rotation thereof.

2. In a vegetable peeler, a bed of displaceable peeling rollers disposed upon parallel axes within the plane of said bed, and a plurality of means for moving said rollers, one of said means rotating said rollers about their respective axes, and another of said means displacing said rollers relatively to one another laterally and normally to the plane of said bed and during the rotation of said members.

3. A peeling bed comprising a plurality of parallel peeling rollers arranged in an upwardly inclined plane, means for rotating said rollers about their respective axes toward the higher side of said bed, and means for moving certain of said rollers out of and into the plane and of said bed to change the contour of said bed while rotating said rollers.

4. A peeling bed comprising a plurality of parallel peeling rollers arranged in an upwardly inclined plane, means for rotating said rollers about their respective axes toward the higher side of said bed, and means for continuously moving certain of said rollers laterally into and out of the plane of said bed while rotating said rollers to constantly change the contour of said bed.

5. Paired peeling beds each comprising a plurality of parallel peeling rollers arranged in two contiguous upwardly inclined planes with their axes transverse to the incline of the beds, means for rotating the rollers in each bed about their respective axes and toward the high side of the bed, and means for continuously moving selected rollers in each bed laterally out of and into the plane of said bed to constantly change the contours of said bed while rotating all of the rollers.

6. Paired peeling beds each comprising a plurality of parallel peeling rollers arranged in two contiguous upwardly inclined beds with their long axes transverse to the incline of the beds, fixed bearing means for certain of said rollers, movable bearing means for other of said rollers, means for constantly reciprocating said movable bearing means and the rollers carried thereby laterally out of and into the planes of said beds, and means for rotating said rollers in each bed about their respective axes toward the high side of each bed.

7. In combination, a series of parallel, horizontal abrading rollers disposed in an upwardly inclined plane, means for rotating said rollers with the upper surface of all of the rollers moving upwardly, and means for shifting the position of the rollers in such inclined plane to agitate the material on said rollers.

8. In combination, a series of parallel, horizontally disposed abrading rollers disposed in an upwardly inclined plane, means for rotating the rollers with the upper surface of all of the rollers moving upwardly, and means for imparting relative movement between adjacent rollers to impart additional movement to the material on the rolls.

9. In combination, a series of parallel, horizontally disposed abrading rollers disposed in an upwardly inclined plane, means connecting adjacent rollers at their axes for relative movement in such plane, means for rotating the rollers with the upper surface of all of the rollers moving upwardly, and means for intermittently changing the position of said connecting means.

10. In combination, a series of parallel, horizontally disposed abrading rollers disposed in an upwardly inclined plane, means connecting adjacent rollers at their axes for relative movement across such plane, means for rotating the rollers with the upper surface of all of the rollers moving upwardly, and means for shifting the position of said connecting means at predetermined intervals.

WILLIAM E. URSCHEL.